US009218793B2

(12) United States Patent
Kakarlapudi et al.

(10) Patent No.: US 9,218,793 B2
(45) Date of Patent: Dec. 22, 2015

(54) INTERMEDIATE VALUE STORAGE WITHIN A GRAPHICS PROCESSING APPARATUS

(71) Applicant: ARM LIMITED, Cambridge (GB)

(72) Inventors: Sandeep Kakarlapudi, Trondheim (NO); Jorn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 351 days.

(21) Appl. No.: 13/658,997

(22) Filed: Oct. 24, 2012

(65) Prior Publication Data

US 2013/0155103 A1    Jun. 20, 2013

(30) Foreign Application Priority Data

Dec. 20, 2011  (GB) .................................. 1121886.4

(51) Int. Cl.
| | |
|---|---|
| G09G 5/39 | (2006.01) |
| G09G 5/377 | (2006.01) |
| G09G 5/36 | (2006.01) |
| G06T 15/00 | (2011.01) |
| G06T 11/40 | (2006.01) |

(52) U.S. Cl.
CPC ................ *G09G 5/377* (2013.01); *G06T 11/40* (2013.01); *G06T 15/005* (2013.01); *G09G 5/363* (2013.01); *G09G 2360/06* (2013.01); *G09G 2360/122* (2013.01)

(58) Field of Classification Search
CPC  G09G 5/39; G09G 2360/12; G09G 2360/122
USPC .......... 345/501, 530, 536, 537, 538, 540, 557
See application file for complete search history.

(56) References Cited

U.S. PATENT DOCUMENTS

| | | | | |
|---|---|---|---|---|
| 5,086,495 A | * | 2/1992 | Gray et al. ..................... | 345/420 |
| 5,748,864 A | * | 5/1998 | Martin .......................... | 345/422 |
| 6,091,428 A | * | 7/2000 | Piazza et al. .................. | 345/545 |
| 6,337,690 B1 | * | 1/2002 | Ashburn et al. ............... | 345/531 |
| 6,483,505 B1 | * | 11/2002 | Morein et al. ................ | 345/419 |
| 6,756,978 B1 | * | 6/2004 | Chen et al. .................... | 345/419 |
| 6,784,884 B1 | * | 8/2004 | Hsieh ............................ | 345/421 |
| 8,547,382 B2 | * | 10/2013 | Kallio ........................... | 345/501 |
| 8,587,581 B2 | * | 11/2013 | Molnar et al. ................ | 345/420 |
| 8,619,085 B2 | * | 12/2013 | Keall et al. .................... | 345/441 |

(Continued)

FOREIGN PATENT DOCUMENTS

| | | |
|---|---|---|
| GB | 2 353 686 | 2/2001 |
| JP | 9-212678 | 8/1997 |

OTHER PUBLICATIONS

Search Report for GB1121886.4, dated Apr. 20, 2012.

(Continued)

*Primary Examiner* — Joni Richer
(74) *Attorney, Agent, or Firm* — Nixon & Vanderhye P.C.

(57) ABSTRACT

A tile-based graphics processor includes tile processing circuitry that has both a tile buffer and a per-pixel general purpose data store. The per-pixel general purpose data store is read accessible and write accessible by the tile processing circuitry to store intermediate values. These intermediate values are generated by the tile processing circuitry and then consumed by the tile processing circuitry to generate the output values for the tile being processed.

35 Claims, 7 Drawing Sheets

(56) References Cited

U.S. PATENT DOCUMENTS

| | | |
|---|---|---|
| 2002/0126138 A1 | 9/2002 | Shekter |
| 2002/0140710 A1* | 10/2002 | Fliflet ............................ 345/660 |
| 2005/0285850 A1* | 12/2005 | Heim et al. .................... 345/418 |
| 2006/0033743 A1 | 2/2006 | Morein |
| 2011/0148919 A1* | 6/2011 | Heggelund et al. ........... 345/629 |

OTHER PUBLICATIONS

Mark et al., "The F-Buffer: A Rasterization-Order FIFO Buffer for Multi-Pass Rendering", *SIGGRAPH*, 2001, pp. 1-7, Aug. 2001.

Bavoil et al., "Multi-Fragment Effects on the GPU using the *k*-Buffer", *Univ. of Utah*, No Date, 8 pages, Apr. 2007.

\* cited by examiner

Pixel N Intermediate Values

Normal vector at pixel N
Albedo value at pixel N
Colour value at pixel N
Specular power value at pixel N
Light intensity value at pixel N
Material identifier value at pixel N Fixed size

FIG. 4

Pixel N Intermediate Values

Transparent Object x depth value

Transparent Object x transparency value

Transparent Object x colour value

Transparent Object y depth value

Transparent Object y transparency value

Transparent Object y colour value

.
.
.

Variable size up to max value

FIG. 5

Pixel Ø Intermediate Value A
Pixel 1 Intermediate Value A
Pixel 2 Intermediate Value A   } Intermediate Value A
       .                                    interleaved wrt pixels
       .
       .
Pixel N Intermediate Value A
Pixel Ø Intermediate Value B
Pixel 1 Intermediate Value B
Pixel 2 Intermediate Value B

.
       .
       .

Pixel N Intermediate Value B
Pixel Ø Intermediate Value C

FIG. 6 ized is divided into a plurality of tiles of adjacent pixel
INTERMEDIATE VALUE STORAGE WITHIN A GRAPHICS PROCESSING APPARATUS This application claims priority to GB Application No. 1121886.4 filed Dec. 20, 2011, the entire contents of which are incorporated herein by reference.

BACKGROUND OF THE INVENTION

1. Field of the Invention

This invention relates to the field of graphics processing. More particularly, this invention relates to tile-based graphics processing and provision of a per-pixel general purpose data store for intermediate values within such tile-based graphics processing.

2. Description of the Prior Art

It is known to provide graphics processing apparatus that operates in accordance with tile-based processing techniques. In tile-based processing techniques an image frame to be processed is divided into a plurality of tiles of adjacent pixel locations. The graphics primitive data specifying graphics objects to be drawn is then subject to a binning operation by which it is identified for each tile which of the graphic primitives will have an effect upon the output values to be generated for that tile. Typically, only a subset of the graphics primitives for a total image frame will impact an individual tile.

When the tiles have been identified and the graphic primitives binned, processing circuitry can fetch from the memory the data it needs to conduct a desired graphics processing operation for the tile concerned. Each primitive is associated with a fragment shader, which is a sequence of programmable instructions. For example there are some instructions to load from special images (called textures) and support for basic arithmetic and sin/cos functions, support for branching and loops etc. The user supplies the fragment shader for each primitive. The fragment shader is typically executed once per each pixel that a primitive overlaps. For example, using basic instructions the user can assemble a program that computes per-pixel lighting. From the GPU's perspective, it is executing arbitrary instructions. When the output values for that tile have been generated using all the graphics primitives identified in the binning step as having an influence upon that tile, then the output values may be written back to the main memory. Tile-based processing is particularly advantageous when used in energy constrained environments as it involves fewer data accesses to main memory thereby reducing energy consumption.

It is known to provide graphics processing operations which are performed using non tile-based graphics processing systems which generate intermediate values that are subsequently used one or more times to build up final pixel colour values. Examples of these graphics processing techniques are deferred shading and drawing order independent transparent objects. Known ways of implementing these processes perform one or more passes over graphics primitives to gather intermediate data in respect of each pixel within the image frame. This intermediate data can then be used multiple times to generate the final pixel colour values. A problem with this approach is that large volumes of intermediate values may be generated and require storage. Another problem is that such methods when applied to a tile-based processing system do not exploit the tile-based processing and increase the number of times the intermediate values need to be either stored to or read from the main memory.

SUMMARY OF THE INVENTION

Viewed from one aspect the present invention provides an apparatus for generating graphics values forming a frame of graphics data from a plurality of graphics primitives, said apparatus comprising:

dividing circuitry configured to divide said frame into a plurality of tiles, each of said plurality of tiles comprising an array of adjacent pixel locations;

binning circuitry configured to identify as overlapping graphics primitives for a given tile of said plurality of tiles those graphics primitives upon which output values depend for pixel locations to be generated for said given tile; and tile processing circuitry configured to execute for some or all overlapping graphics primitive for said given tile a sequence of programmable instructions for some or every pixel location overlapped by a given graphics primitive, said tile processing circuitry including a tile buffer and a per-pixel general purpose data store; wherein said tile processing circuitry is configured to execute said programmable instructions at pixel locations overlapped by primitives to perform write accesses and read accesses to said per-pixel general purpose data store for storing intermediate values during rendering said given tile to generate output values.

The present technique recognises that in the context of a tile-based processing system, if a per-pixel general purpose data store is provided to the tile processing circuitry controlled by the programmable instructions which generate the intermediate parameter values, then it is possible to store these intermediate values without writing them back to the main memory such that the intermediate values may then be consumed by the tile processing circuitry (e.g. using instructions or directly) so as to generate the desired output values. As a tile-based processor, by virtue of its binning of the graphics primitives so as to divide the processing workload into separate workloads for each tile, has by its nature reduced the amount of intermediate value storage required to only that required for the tile itself, this may be a relatively manageable amount of data storage and accordingly can be provided with a per-pixel general purpose data store to which the tile processing circuitry has both write access and read access to avoid any requirement to store a large volume of intermediate values out to main memory.

The per-pixel general purpose data store is provided as well as the normal tile buffer into which output values are normally accumulated by the tile processing circuitry. The per-pixel general purpose data store can be used for a wide variety of different processing operations performed by the tile processing circuitry under control of the program of instructions. Thus, for example, programmable instructions may be executed by the tile processing circuitry to achieve processing operations such as deferred shading combined with order independent transparency operations. Other graphics processing operations may also be supported by the program of the instructions by storing general data and implementing data structures, such as dynamic arrays and stacks for each pixel in the per-pixel general purpose data store.

The output values generated can have a variety of forms. The output values may be pixel colour values or may be other forms of value, which may be further processed so as to ultimately generate colour pixel values.

The tile processing circuitry may be configured to discard the intermediate values stored within the per-pixel general purpose data store after use and/or generating the output values. The present technique breaks down the processing to be performed into tiles and once the output values for a tile have been generated then there may be no longer any need to store the intermediate values for that tile. Accordingly, these intermediate values may be discarded. This reduces the amount of storage which needs to be provided for intermediate values as only the intermediate values for the one or more tiles currently being processed need to be stored. This reduces the amount of overall storage capacity needed.

The per-pixel general purpose data store can have a variety of different forms. In some embodiments the tile buffer may have a greater capacity than is required for the processing operations currently being performed. For example, a tile buffer may have a capacity sufficient to support anti-aliasing operations in which multiple pixel values are stored in respect of each pixel location eventually to be generated. In this context, when anti-aliasing is not employed, the excess capacity of the tile buffer is unused and this unused portion of the tile buffer can serve as the per-pixel general purpose data store. The size of the tiles may also be reduced to free capacity within the tile buffer to serve as the per-pixel general purpose data store.

In other embodiments a portion of main memory address may be allocated to serve as the per-pixel general purpose data store. In these embodiments a cache memory disposed between the main memory and the tile processing circuitry can serve to cache the memory locations allocated in the main memory. Thus, actual writes or reads to the main memory may be replaced by writes and reads to the cache memory thereby avoiding the high energy cost associated with writes from and read to the main memory. This approach exploits the realisation that the per-pixel general purpose data store will generally be small and accordingly likely to be fully accommodated with a cache memory for at least the duration of its use.

Traffic to the main memory can be further reduced by employing a write gathering cache memory in this role or potentially using a locked down portion of a cache memory in this role. There are other possibilities for storage which may serve as the per-pixel general purpose data store, such as unused register storage or unused other buffer stores within a graphics processing apparatus that are available when required for use as the per-pixel general purpose data store.

The per-pixel general purpose data store may be conveniently configured to individually store a plurality of intermediate values for each pixel location of the selected tile. Thus, the tile processing circuitry may generate for each pixel location a plurality of intermediate values relating to that pixel location which are then stored within a location within the per-pixel general purpose data store. The intermediate values stored in this way may then be consumed out of the per-pixel general purpose data store upon a pixel-by-pixel basis to generate the output values.

The plurality of intermediate values for different pixel locations within the per-pixel general purpose data store may be stored in an interleaved arrangement. Thus, all the intermediate values of a particular type, but relating to different pixel locations, may be stored adjacent to each other. Arranging the per-pixel general purpose data store in this way tends to improve data coherency, which is particularly useful when the additional data store has the form of a portion of a cache memory. The interleaving format may vary and may be configurable.

The per-pixel general purpose data store may be configured to store the intermediate values as a memory stack. Storing the intermediate values in this way increases flexibility, particularly when it is unknown exactly how many intermediate values will be written to the per-pixel general purpose data store and read from the per-pixel general purpose data store.

In order to reduce the overhead associated with the per-pixel general purpose data store, some embodiments may be arranged such that if a read is performed to a location within the per-pixel general purpose data store that has not been previously written for the selected tile currently being processed, then a default value will be returned. This avoids the need to clear the complete per-pixel general purpose data store before it is used by the selected tile as it only clears the portions that will be used by the selected tile. In some embodiments the hardware may be arranged to respond to such a read which triggers the return of a default value by clearing the per-pixel general purpose data store under hardware control. The default value returned may in some embodiments be a clear colour value.

The tile processing circuitry may be configured to perform accesses to the per-pixel general purpose data store in the order the graphics primitives were ordered (i.e. draw call order). This allows the tile processing circuitry to process pixels belonging to multiple primitives in parallel while still producing correct values in the per-pixel general purpose data store as if the primitives were processed one at a time.

As previously mentioned, the intermediate values generated may be the result of a wide variety of different desired processing operation. In some embodiments the intermediate values are per pixel lighting parameters generated and then consumed to calculate a corresponding pixel value in dependence upon data defining one or more light sources lighting the pixel concerned. In this context the per pixel lighting intermediate values may include one or more of a normal vector value, a specular power value, a light intensity value, a material identifier value, a colour value and an albedo value for a surface location corresponding to the pixel concerned.

Another type of processing operation to which the present technique provides efficient support is where the intermediate values are per pixel transparent object parameters generated and consumed during processing operations to represent one or more transparent objects to calculate a corresponding pixel value including any effect of the one or more transparent objects. In this context the transparent object parameters may include a depth value, a transparency value and a colour value of a transparent object for a location corresponding to the pixel concerned.

An efficient processing operation may be one that generates intermediate values corresponding to a pixel, and consumes the intermediate values corresponding to the pixel in further operations. Some processing operations require generating multiple intermediate values and later accessing the intermediate values from pixels locations including locations from tiles that have not been processed yet. The intermediate values are output to multiple render targets (MRTs). The per-pixel general purpose data store can be configured to be used as a multiple render targets, in which case the contents of the per-pixel general purpose data store will be output as multiple output values per pixel. These specific processing operations require that storage be allocated in memory for all tiles in the image frame.

The per-pixel general purpose data store may in some embodiments have a static size which may be a fixed allocation of per-pixel general purpose data store. In other embodiments the per-pixel general purpose data store may have a variable size that is increased as needed to a maximum sized limit. An individual implementation may be configured to support both of these options. When multiple render targets are used storage will be allocated for use as the per-pixel general purpose data store with sufficient capacity to store the intermediate values for all the tiles within a frame.

As previously mentioned, the present technique may be used with advantage in embodiments in which storage of a data value to the main memory consumes more energy than storage of the data value to the per-pixel general purpose data store. However, even when this is not the case, then the present technique may be advantageous in simply reducing the amount of storage required as the per-pixel general purpose storage need only be supplied in respect of those tiles undergoing processing at any given time.

Viewed from another aspect the present invention provides a method of generating graphics values forming a frame of graphics data from a plurality of graphics primitives, said method comprising the steps of:

dividing said frame into a plurality of tiles, each of said plurality of tiles comprising an array of adjacent pixel locations;

binning said graphics primitives to identify as overlapping graphics primitives for a given tile of said plurality of tiles those graphics primitives upon which output values depend for pixel locations to be generated for said given tile; and for each tile of said plurality of tiles respectively serving as said given selected tile:
 (i) providing for use during rendering said given tile a tile buffer for storing said output values and a per-pixel general purpose data store;
 (ii) performing processing operations by executing for some or all overlapping graphics primitive for said given tile a sequence of programmable instructions for some or every pixel location overlapped by a given graphics primitive, said processing operations including under programmable instruction control writing a plurality of intermediate values to said per-pixel general purpose data store for said given tile, reading said plurality of intermediate values from said per-pixel general purpose data store and using said intermediate values to generate output values.

Viewed from a further aspect the present invention provides an apparatus for generating graphics values forming a frame of graphics data from a plurality of graphics primitives, said apparatus comprising:

dividing means for dividing said frame into a plurality of tiles, each of said plurality of tiles comprising an array of adjacent pixel locations;

binning means for identifying as overlapping graphics primitives for a given tile of said plurality of tiles those graphics primitives upon which output values depend for pixel locations to be generated for said given tile; and tile processing means for separately processing each tile of said plurality of tiles as a selected tile, said tile processing means including tile buffer means for storing output values and per-pixel general purpose data storage means for storing intermediate values; wherein said tile processing means has write access and read access to said per-pixel general purpose data storage means for storing said intermediate values during rendering said selected tile to generate said output values for storing in said tile buffer means; and said tile processing means stores said output values for said subject tile from said tile buffer to a main memory to form part of said frame.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically illustrates intermediate values that may be used to support deferred shading operations;

FIG. 5 illustrates one example of intermediate values that may be used to support the rendering of order independent transparent objects;

FIG. 6 schematically illustrates the interleaving of intermediate values for different pixel locations within the per-pixel general purpose data store;

DESCRIPTION OF THE EMBODIMENTS

Figure 1:
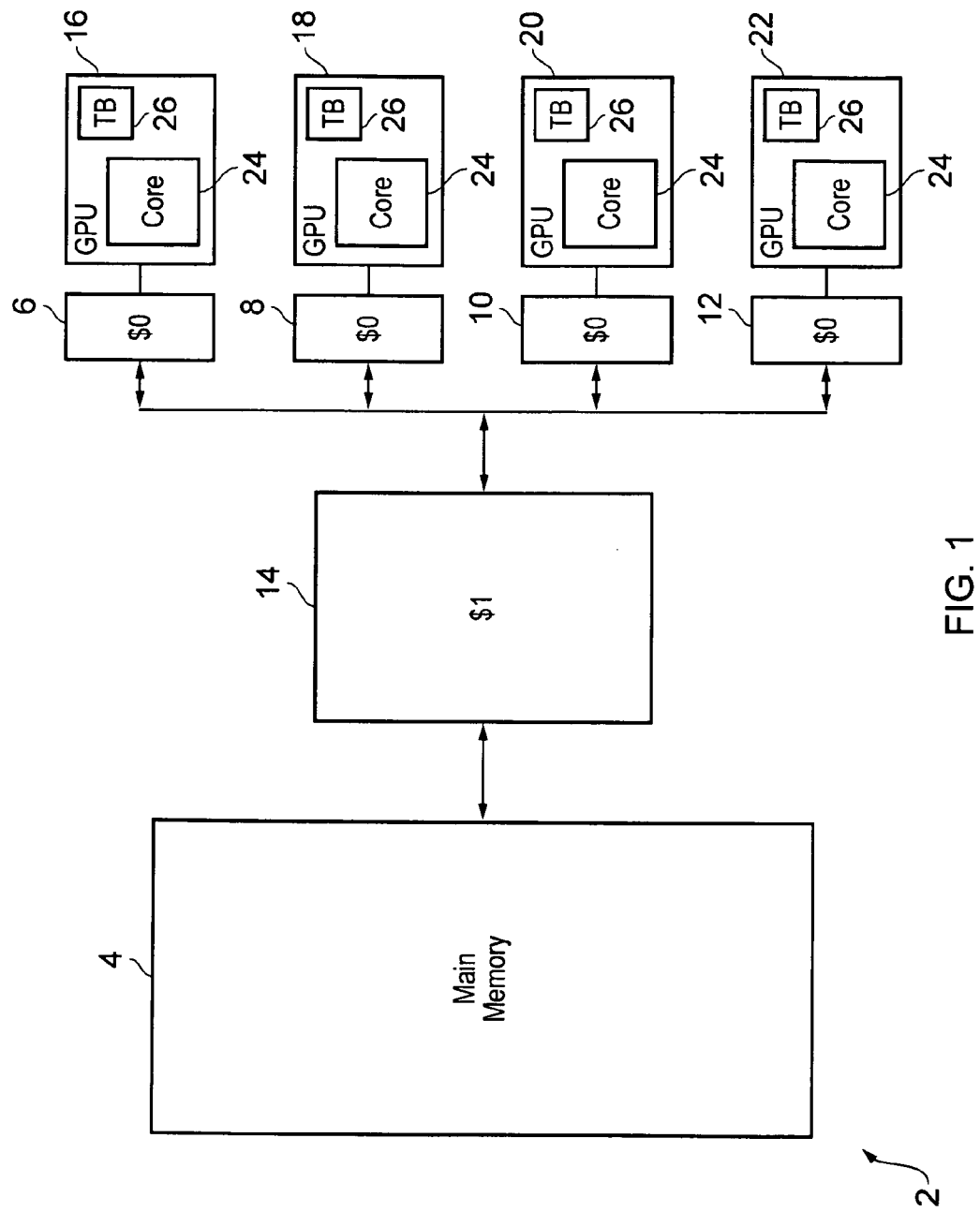
FIG. 1 schematically illustrates a graphics processing apparatus incorporating a main memory, a cache memory system and multiple graphics cores.

FIG. 1 schematically illustrates a system to include a main memory 4 coupled via a cache system comprising a plurality of level zero caches 6, 8, 10, 12 and a level one cache 14 to respective graphics processing unit 16, 18, 20, 22. Each of the graphics processing units includes a processing core 24 and a tile buffer 26. The graphics cores 24 include at least a fragment shader pipeline stage which operates upon a tile of pixel locations by repeatedly executing programmable instructions in respect of each pixel location and each graphics primitive to be rendered for that pixel location. Such tile-based processors are in themselves known in this technical field and will not be described in detail herein. In particular, mechanisms to perform the binning of graphics primitives and mechanisms to collect the output pixel values and to form the ultimately desired frame of pixel colour values will be familiar to those in this technical field.

Figure 2:
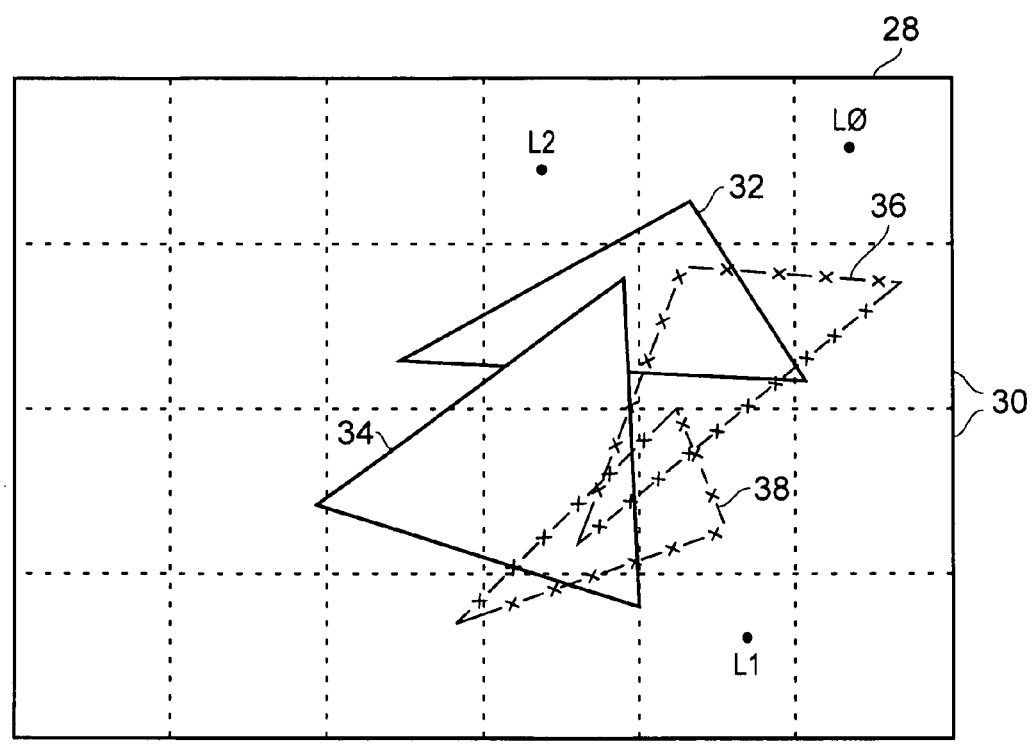
FIG. 2 schematically illustrates an image to be formed including multiple graphics primitives.

FIG. 2 illustrates an image 28 to be rendered. This image 28 may be divided into a plurality of tiles 30 which are subject to separate processing. The image 28 includes a plurality of graphics primitives, such as solid triangles 32, 34 and transparent triangles 36, 38. Also included within the image 28 are multiple light sources L0, L1 and L2 that are used to light/shade the objects within the image 28. The rendering of solid graphics primitives and transparent graphics primitives as well as the use of multiple light sources to generate the pixel colour values that are ultimately used by the image frame 28 will again be familiar to those in this technical field. However, the present techniques of providing and utilising an per-pixel general purpose data store that is read and write accessible to the tile processing circuitry which executes the programmable instructions in respect of each pixel location will be described further below.

Figure 3:
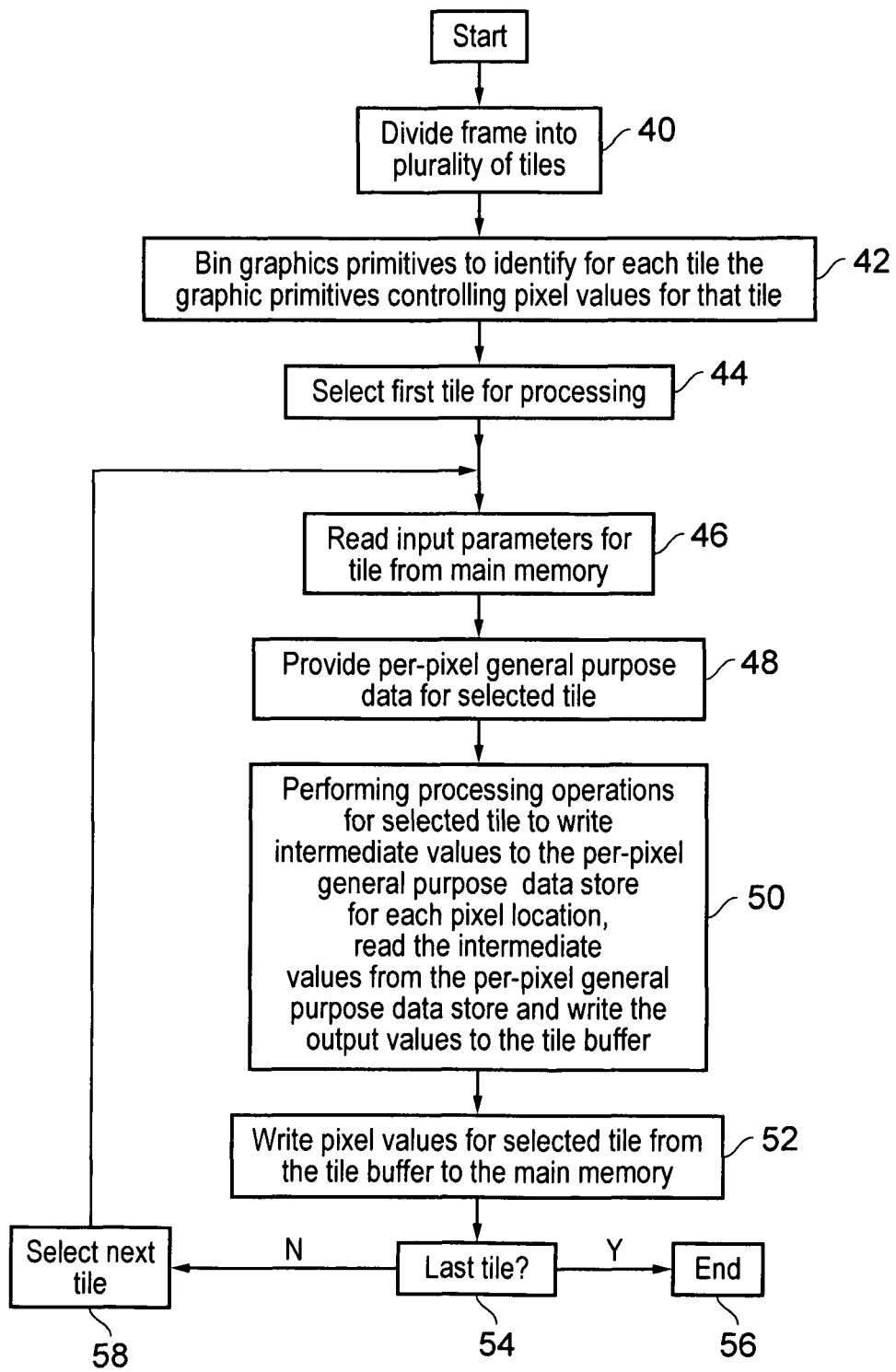
FIG. 3 is a flow diagram schematically illustrating processing operations in accordance with one example embodiment of the present techniques.

FIG. 3 is a flow diagram schematically illustrating processing operations in accordance with one embodiment of the present technique. At step 40 an image frame is divided into a plurality of tiles each to be separately processed. At step 42 the graphics primitives within the image frame to be processed are identified and allocated to bins (collections in respect of different tiles) such that the graphics primitives which will control the output values to be generated for a given tile are all allocated into the bin for that given tile.

At step 44 the first tile is selected for the current processing operation. The current processing operation may, for example, be the rendering of transparent objects using an order independent transparent object rendering algorithm. Another example of the processing to be performed may be a shading operation to light the pixel locations in dependence upon one or more light sources within the scene. Other forms of rendering where intermediate values correspond to a pixel are generated and later consumed may also be envisaged and are encompassed within the present techniques.

At step 46 the input parameters required for the processing to be performed are read from the main memory. At step 48 the per-pixel general purpose data store for the selected tile is allocated. This per-pixel general purpose data store may be provided, for example, by the use of unused storage space within the tile buffer 26 or may be provided as storage locations within a cache memory 6, 8, 10, 12 (optionally locked down). Step 50 performs the desired processing operations for the selected tile including executing instructions for pixels corresponding to each primitive which may write intermediate values to the per-pixel general purpose data store and writing the output values to the tile buffer 26. Step 52 then writes the pixel values for the selected tile from the tile buffer back to the main memory.

It will be seen from the above that steps 46 and 52 perform accesses to the main memory. A large number of accesses may be performed at step 50 (texturing instructions are often used in step 50 and constitute access to main memory) that both write intermediate values and read intermediate values to and from the per-pixel general purpose data store and these may be performed at relatively low energy cost. Furthermore, since these intermediate values relate to the tile currently selected for processing, they are relatively few in number compared to the total amount of image data corresponding to the image frame. Furthermore, once the intermediate values have been generated and consumed in step 50, they may be discarded when the processing for that tile is complete.

Step 54 determines whether or not the last tile has been processed. If the last tile has been processed, then processing terminates at step 56. If the last tile has not yet been processed, then step 58 selects the next tile in the sequence and processing returns to step 46.

FIG. 4 schematically illustrates a plurality of intermediate values that may be generated/consumed as part of light shading processing in accordance with the present techniques. The intermediate values that can be stored on a per-pixel basis within the per-pixel general purpose data store include a normal vector, an albedo value, a colour value, a specular power value, a light intensity value and a material identifier value in respect of that pixel. It will be appreciated that the above is only one example of the intermediate values that may be stored. Further intermediate values may be stored in different embodiments and some embodiments may not store all of the above listed intermediate values. All of these variations are included in the present techniques.

The intermediate values illustrated in FIG. 4 have a fixed size as the number of pixels within a tile is fixed and the number of intermediate parameters per pixel is fixed. Accordingly, the intermediate values illustrated in FIG. 4 may be stored within a fixed sized per-pixel general purpose data store. If size permits within an unused portion of a tile buffer 26, then such an unused portion may serve as the per-pixel general purpose data store for the intermediate values FIG. 4.

FIG. 5 schematically illustrates another set of intermediate values that may be stored within the per-pixel general purpose data store for a different type of processing performed by the tile processing circuitry under programmable instruction control. In this example, the processing performed is to render transparent objects in accordance with an order independent algorithm. In order to perform such rendering, the intermediate values are assembled to represent the respective transparent objects to be rendered. In respect of each transparent object the intermediate values may specify a depth value, a transparency value and a colour value. These intermediate values are stored on a pixel basis. Thus, when all of the intermediate values have been generated, then for each pixel location the intermediate value specifying the transparent objects having an influence upon that pixel location may be read. The depth values may be used to control the ordering in which those transparent objects are processed until the final transparent object is processed.

It will be appreciated that it will not be known in advance how many transparent objects may influence a pixel location. Accordingly, the per-pixel general purpose data store may have a variable size, up to a maximum value, in order to store intermediate values in respect of a variable number of transparent objects. Such a per-pixel general purpose data store may be provided by allocating memory address space within the main memory 4. When such memory address space is allocated, the intermediate values need not actually be written to the main memory 4 or read from the main memory 4 as an intervening cache memory may instead be used to store the intermediate values close to the tile processing circuitry in a manner that provides energy efficient access to those intermediate values. In particular, if the cache memory is a write gathering memory cache, then the normal processing performed will likely generate all of the intermediate values that it will then consume without any need to actually write back the intermediate values to the main memory from the write gathering cache as the intermediate values are not required after the tile concerned has been processed and thus may be discarded once the output values for that tile have been generated.

FIG. 6 schematically illustrates the interleaving of parameter values of the same type from different pixel locations within the per-pixel general purpose data store. As illustrated in FIG. 6, the intermediate value A in respect of pixels 0 to N are all as stored in consecutive storage locations. Then, the intermediate values B for the same sequence of pixel values are against or adjacent to each other. When the tile processing circuitry wishes to access an individual parameter value for an individual pixel, offsets may be used to index into the per-pixel general purpose data store and select the appropriate intermediate value of the correct parameter type and for the correct pixel.

It will be appreciated that when the per-pixel general purpose data store relates to an allocated region within the main memory 4, then the tile processing circuitry may be programmed with a base index value indicating the start of the address space for that per-pixel general purpose data store within the main memory 4. Thus, the programmable instructions executed by the tile processing circuitry may use this base address offset in order to calculate the storage location of a desired intermediate value to be fetched from the per-pixel general purpose data store (e.g. from a cache memory which will be indexed with memory addresses).

Figure 7:
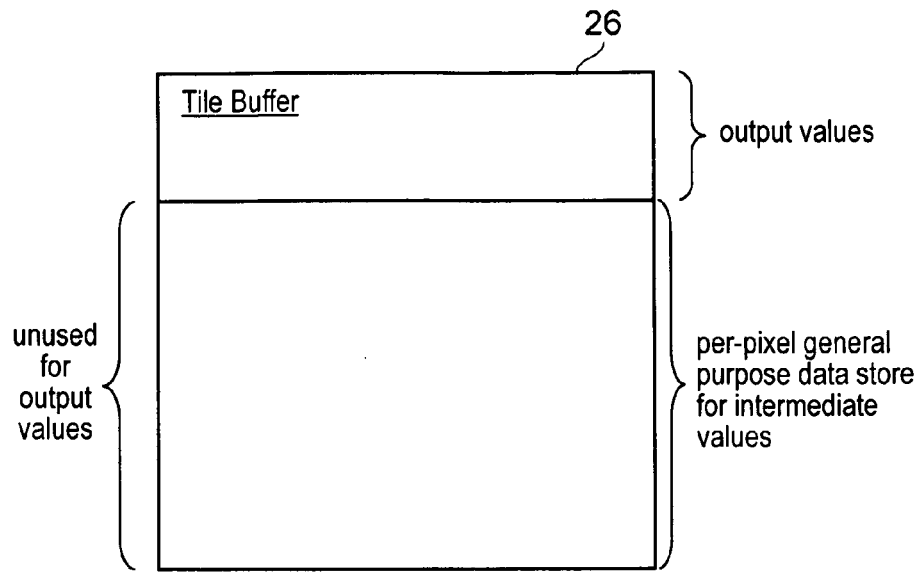
FIG. 7 schematically illustrates the provision of the per-pixel general purpose data store in the form of an unused portion of a tile buffer.

FIG. 7 illustrates one example embodiment in which space within a tile buffer 26 which is unused for output values serves to provide the per-pixel general purpose data store for the intermediate values. As an example, a tile buffer 26 may be large enough to support anti-aliasing operations in which multiple pixel values are stored for use in generating a final output value for each pixel location. When anti-aliasing is not being employed, then the additional capacity of tile buffer 26 may be used to serve as the per-pixel general purpose data store.

Figure 8:
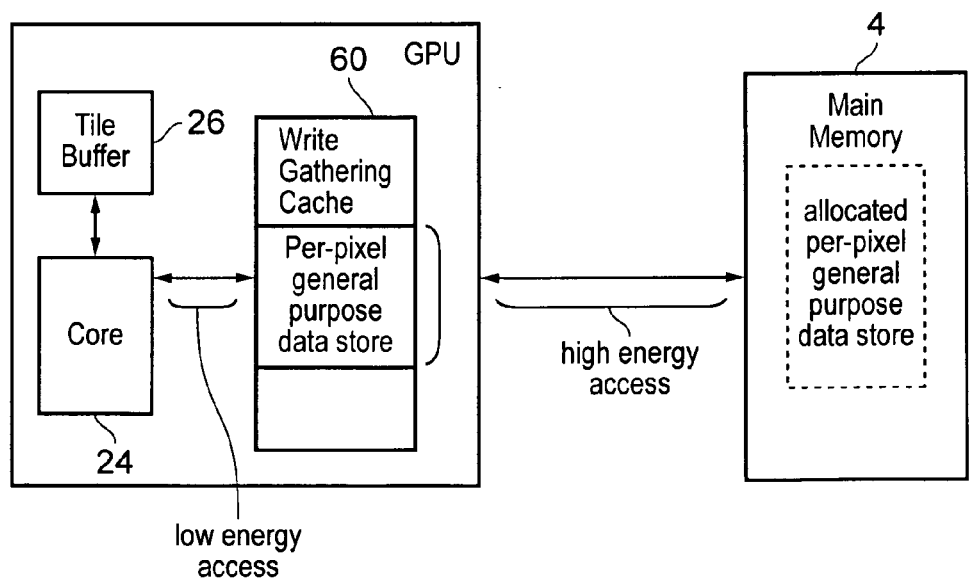
FIG. 8 schematically illustrates the provision of an per-pixel general purpose data store as part of a write gathering cache.

FIG. 8 schematically illustrates another example embodiment. In this example embodiment, the per-pixel general purpose data store corresponds to an allocated region within the main memory 4. However, a write gathering cache 60 is provided which serves to store intermediate values and acts as the per-pixel general purpose data store. The intermediate values are generated by the graphics core 24 and written into the write gathering cache 60 before being read back from the write gathering cache 60 as they are consumed. The intermediate values are discarded at the end of the processing of each tile and accordingly need never be written back to the main memory 4.

Each cache line within the write gathering cache 60 used as part of a per-pixel general purpose data store may be associated with a "cleared" bit within the graphics core 24. When a new tile starts to be processed, then all of these bits are set to indicate that the corresponding cache lines have not been cleared. If a cache line is allocated for use as part of an per-pixel general purpose data store and then is subject to a read or a write operation, then the "clear" bit is read for that cache line to determine whether or not that cache line has already been cleared for the processing of the tile concerned. If the cache line has not already been cleared, then it is cleared and the "clear" bit is changed accordingly such that it will not be cleared again for the processing of the current tile. If the access concerned is a read access, then in addition to the clear operation, a default value will be returned for the read. This default value may, for example, be a clear colour value. If the access operation is a write, then in addition to the clear performed for the cache line, the parameter value concerned is written to the cache line.

It will be appreciated that the per-pixel general purpose data store may have a fixed size or a variable size as previously discussed. It is possible for the per-pixel general purpose data store to be arranged as a memory stack. Such an arrangement is particularly useful in the context of a variable size per-pixel general purpose data store, such as that described in relation to FIG. 5.

Figure 9:
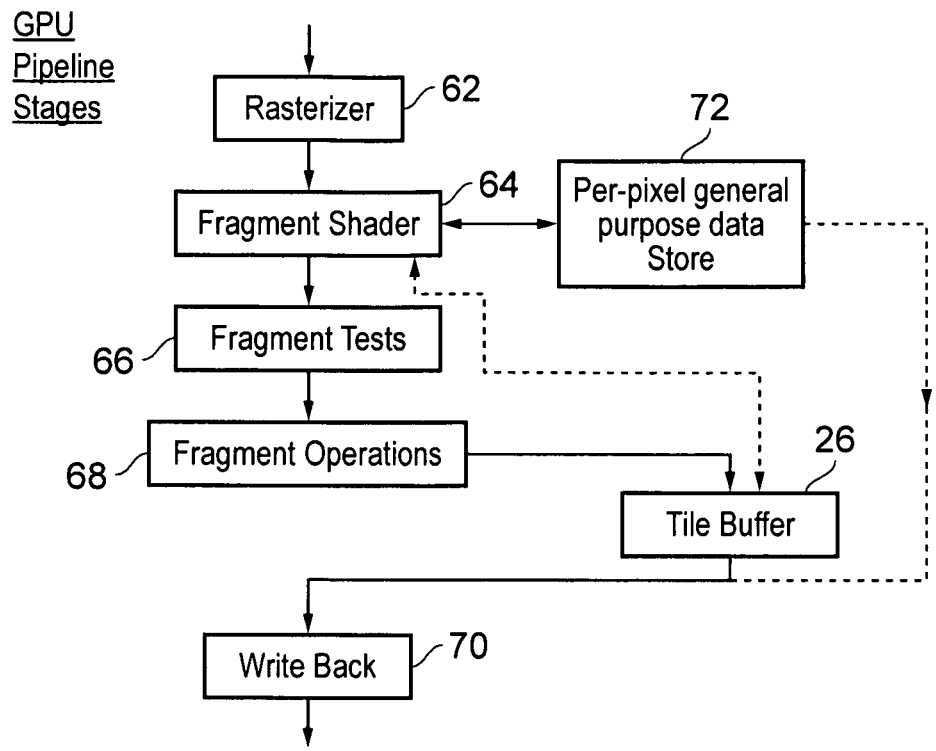
FIG. 9 schematically illustrates some of the graphics pipeline stages within a tile based graphics processing apparatus.

FIG. 9 schematically illustrates some of the processing stages provided within the graphics core 24. These include stages which serve as a rasteriser 62, a fragment shader 64, a fragment tester 66, a fragment operations stage 68 and a write back stage 70. The fragment shader 64 is programmable and repeatedly executes for each pixel location associated with each primitive, programmable instructions to perform the processing operations. Some of those instructions may generate the intermediate values as discussed above. These intermediate values are stored within the per-pixel general purpose data store 72. The fragment shader 64 has read access and write access to the tile buffer 26. In some embodiments the write back stage 70 may draw some of the output values from the per-pixel general purpose data store. In general, the write back stage 70 will draw the output values from the tile buffer 26. The provision of the per-pixel general purpose data store 72 providing storage for intermediate values for use by the fragment shader 64 increases the capability of processing operations which may be performed by the fragment shader 64. This increase in flexibility is achieved without an excessive increase in the amount of storage that needs to be provided as the intermediate value stored are those relating to the tile being processed and accordingly a relatively small capacity is necessary for the per-pixel general purpose data store 72 in most circumstances.

In some embodiments the configuration may be such that writes to the per-pixel general purpose data store 72 can happen only if the graphics primitive being processed passes the one or more fragment tests performed by the fragment tester 66 at that pixel/sample location.

In the case of the FIG. 9 embodiment operating on a proper background, for each primitive the rasterizer generates a fragment for each pixel that the primitive overlaps. Each fragment then passes through the stages shown in FIG. 9. In the fragment shader stage, instructions are executed corresponding to that fragment. In the Fragment tests stage, the fragment is tested against various fragment tests. If any test fails the fragment is killed (is not processed further, and will not be written to the tilebuffer.)

The fragment tests may include: scissor, alpha, stencil, depth. The most common of these are the depth and the stencil tests. The fragment passes the depth test if the fragment's depth when compared with the depth stored in the tile buffer at that pixel location passes the depth function. The depth function can be configured to perform comparisons such as "less than", "less than or equal", "greater", "greater or equal", "equal", "not equal" "always", "never". The stencil test may be similar except a reference value is compared with the stencil value stored in the tile buffer at that pixel location. Scissor and alpha test are logically expected to be in the Fragment tests, but these may also be implemented in other stages.

Figure 10:
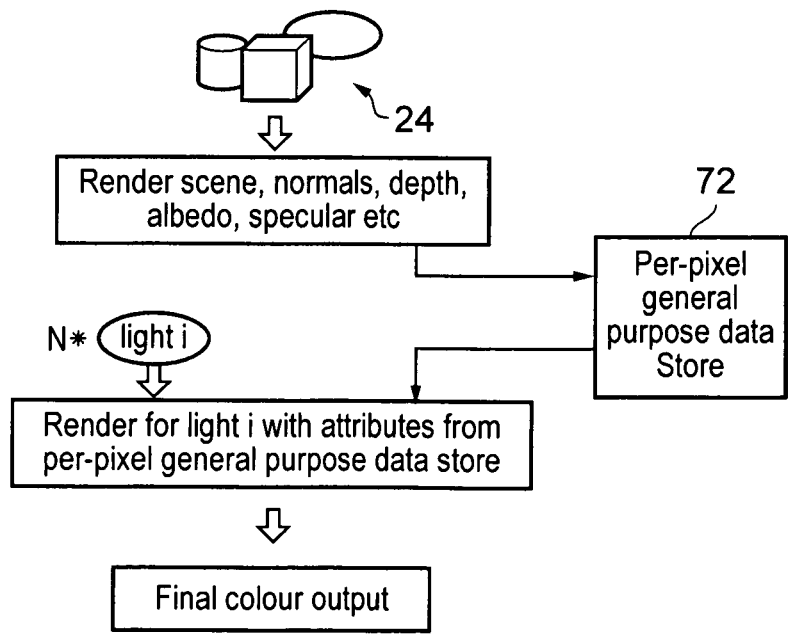
FIG. 10 schematically illustrates use of the present technique in support of deferred shading within a tile-based graphics processing apparatus.

FIG. 10 schematically illustrates another way of viewing the operation of the present technique in the context of the lighting/shading of an image using multiple light sources. A collection of graphics primitives 74 are subject to processing which renders the scene, normals for each pixel location, the depth for each pixel location, the albedo for each pixel location, the specular intensity for each pixel location and the like. The normal vector value, the depth value, the albedo value, the specular intensity value and the like are intermediate values which are stored in the per-pixel general purpose data store 72. For each pixel location influenced by a light i within a collection of N such lights, the intermediate values are read from the per-pixel general purpose data store 72, and used to compute lighting for the pixel location and accumulate the result of the lighting into final colour outputs for the pixel location. Thus, for a given tile, there is only one pass through the graphics pipeline in order to both generate the intermediate values, that are temporarily stored within the per-pixel general purpose data store 72, and then consumed to generate the final colour output for the tile concerned.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for generating graphics values forming a frame of graphics data from a plurality of graphics primitives, said apparatus comprising:
    dividing circuitry configured to divide said frame into a plurality of tiles, each of said plurality of tiles comprising an array of adjacent pixel locations;
    binning circuitry configured to identify as overlapping graphics primitives for a given tile of said plurality of tiles those graphics primitives upon which output values depend for pixel locations to be generated for said given tile; and tile processing circuitry configured to execute for some or all overlapping graphics primitive for said given tile a sequence of programmable instructions for some or every pixel location overlapped by a given graphics primitive, said tile processing circuitry including a tile buffer to store output values and a per-pixel general purpose data store to store intermediate values separate from said output values; wherein said tile processing circuitry is configured to execute said programmable instructions at pixel locations overlapped by primitives to perform write accesses and read accesses to said per-pixel general purpose data store for storing said intermediate values during rendering said given tile to generate said output values.

2. Apparatus as claimed in claim 1, wherein said tile processing circuitry is configured to discard said intermediate values stored within said per-pixel general purpose data store after use in generating said output values.

3. Apparatus as claimed in claim 1, wherein said per-pixel general purpose data store is one of:
a unused portion of said tile buffer; and
a portion of a main memory stored within a cache memory.

4. Apparatus as claimed in claim 1, wherein said per-pixel general purpose data store is configured to individually store a plurality of intermediate values for each pixel location of said given tile.

5. Apparatus as claimed in claim 4, wherein said per-pixel general purpose data store is configured to store said plurality of intermediate values for different pixels within storage locations of said per-pixel general purpose data store in an interleaved arrangement.

6. Apparatus as claimed in claim 1, wherein said tile processing circuitry is part of a graphics processing unit.

7. Apparatus as claimed in claim 1, wherein said per-pixel general purpose data store is configured to store said intermediate values as a memory stack.

8. Apparatus as claimed in claim 1, wherein said tile processing circuitry is configured to return a default value if a read is performed to a location within said per-pixel general purpose data store that has not previously been written for said given tile.

9. Apparatus as claimed in claim 8, wherein said default value is a clear colour value.

10. Apparatus as claimed in claim 1, wherein said tile processing circuitry is configured to perform accesses to said per-pixel general purpose data store in draw call order.

11. Apparatus as claimed in claim 1, wherein capacity within said tile buffer is released to serve as per-pixel general purpose data store by reducing the tile size in number of pixels of each of said plurality of tiles.

12. Apparatus as claimed in claim 1, wherein a plurality of sets of output data are produced for each pixel, at least some of said sets of output data being stored in said per-pixel general purpose data store, said per-pixel general purpose data store corresponding to memory address space within a main memory.

13. Apparatus as claimed in claim 1, wherein said tile processing circuitry is configured to respond to said programmable instructions to perform an append access to said per-pixel general purpose data store using a per-pixel counter stored in the per-pixel general purpose buffer store.

14. Apparatus as claimed in claim 1, wherein said per-pixel general purpose data store is configured to store a plurality of sets of intermediate values from each sample location within each pixel location.

15. Apparatus as claimed in claim 1, wherein said per-pixel general purpose data store has one of:

a static size fixed upon allocation of said per-pixel general purpose data store; and
a variable size that is increased as needed up to a maximum size limit.

16. Apparatus as claimed in claim 1, wherein storage of a data value to said main memory consumes more energy than storage of said data value to said per-pixel general purpose data store.

17. Apparatus as claimed in claim 1, wherein said write accesses to said per-pixel general purpose data store are permitted only if a primitive being processed passes one or more fragment tests at that pixel location.

18. A method of generating graphics values forming a frame of graphics data from a plurality of graphics primitives, said method comprising the steps of:
dividing said frame into a plurality of tiles, each of said plurality of tiles comprising an array of adjacent pixel locations;
binning said graphics primitives to identify as overlapping graphics primitives for a given tile of said plurality of tiles those graphics primitives upon which output values depend for pixel locations to be generated for said given tile; and
for each tile of said plurality of tiles respectively serving as said given selected tile:
(i) providing for use during rendering said given tile a tile buffer to store said output values and a per-pixel general purpose data store to store a plurality of intermediate values separate from said output values;
(ii) performing processing operations by executing for some or all overlapping graphics primitive for said given tile a sequence of programmable instructions for some or every pixel location overlapped by a given graphics primitive, said processing operations including under programmable instruction control writing said plurality of intermediate values to said per-pixel general purpose data store for said given tile, reading said plurality of intermediate values from said per-pixel general purpose data store and using said intermediate values to generate said output values.

19. A method as claimed in claim 18, wherein said intermediate values stored within said per-pixel general purpose data store are discarded after use in generating said output values.

20. A method as claimed in claim 18, wherein said per-pixel general purpose data store is one of:
a unused portion of said tile buffer; and
a portion of said main memory stored within a cache memory.

21. A method as claimed in claim 18, wherein said per-pixel general purpose data store individually stores a plurality of intermediate values for each pixel location of said given tile.

22. A method as claimed in claim 21, wherein said plurality of intermediate values for different pixels are stored within storage locations of said per-pixel general purpose data store in an interleaved arrangement.

23. A method as claimed in claim 18, wherein said processing operations are performed by a graphics processing unit.

24. A method as claimed in claim 18, wherein said intermediate values are stored as a memory stack within said per-pixel general purpose data store.

25. A method as claimed in claim 18, wherein if a read is performed to a location within said per-pixel general purpose data store that has not previously been written for said given tile, then a default value is returned.

26. A method as claimed in claim 25, wherein said default value is a clear colour value.

27. A method as claimed in claim 18, wherein accesses to said per-pixel general purpose data store are performed in draw call order.

28. A method as claimed in claim 18, wherein capacity within said tile buffer is released to serve as per-pixel general purpose data store by reducing the tile size in number of pixels of each of said plurality of tiles.

29. A method as claimed in claim 18, wherein a plurality of sets of output data are produced for each pixel, at least some of said sets of output data being stored in said per-pixel general purpose data store, said per-pixel general purpose data store corresponding to memory address space within a main memory.

30. A method as claimed in claim 18, comprising performing an append access to said per-pixel general purpose data store using a per-pixel counter stored in the per-pixel general purpose buffer store.

31. A method as claimed in claim 18, comprising storing within said per-pixel general purpose data store a plurality of sets of intermediate values for each sample location within each pixel location.

32. A method as claimed in claim 18, wherein said per-pixel general purpose data store has one of:
   a static size fixed upon allocation of said per-pixel general purpose data store; and
   a variable size that is increased as needed up to a maximum size limit.

33. A method as claimed in claim 18, wherein storage of a data value to said main memory consumes more energy than storage of said data value to said per-pixel general purpose data store.

34. A method as claimed in claim 18, wherein step of writing is permitted only if a primitive being processed passes one or more fragment tests at that pixel location.

35. Apparatus for generating graphics values forming a frame of graphics data from a plurality of graphics primitives, said apparatus comprising:
   means for dividing said frame into a plurality of tiles, each of said plurality of tiles comprising an array of adjacent pixel locations;
   means for identifying as overlapping graphics primitives for a given tile of said plurality of tiles those graphics primitives upon which output values depend for pixel locations to be generated for said given tile; and
   means for separately processing each tile of said plurality of tiles as a selected tile, said means for separately processing each tile including means for storing output values and means for storing intermediate values separate from said output values; wherein
   said means for separately processing each tile has write access and read access to said means for storing said intermediate values during rendering said selected tile to generate said output values for storing in said means for storing output values; and
   said means for separately processing each tile is configured to store said output values for said subject tile from said means for storing output values to a main memory to form part of said frame.

* * * * *